June 2, 1931.  H. FAEHRMANN  1,808,645
MECHANICALLY OPERATED SAFETY BRAKE
Filed Aug. 19, 1930
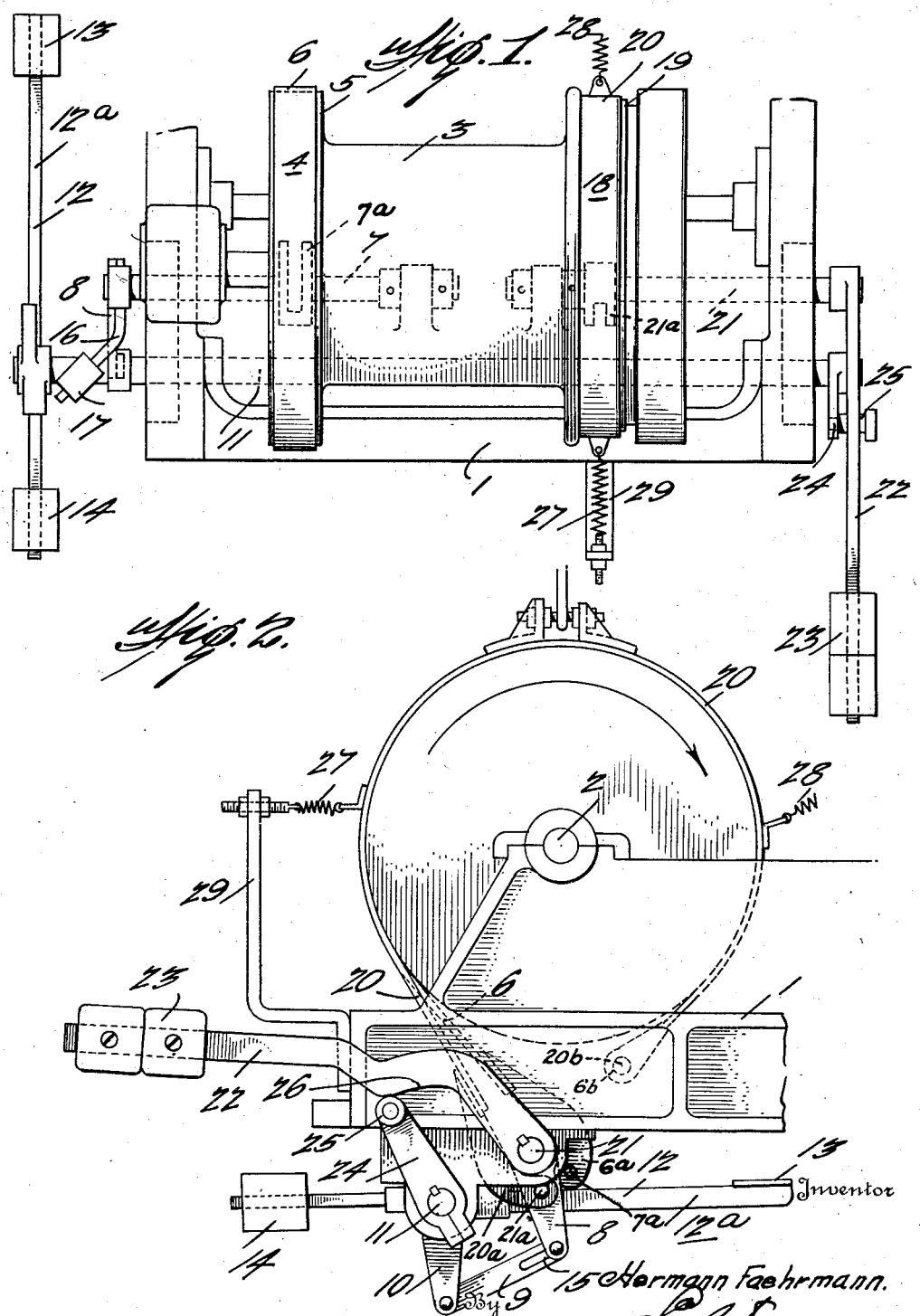
Inventor
Hermann Faehrmann.
Attorney Patented June 2, 1931

1,808,645

UNITED STATES PATENT OFFICE

HERMANN FAEHRMANN, OF BROOKLYN, NEW YORK, ASSIGNOR TO J. S. MUNDY HOISTING ENGINE COMPANY, OF NEWARK, NEW JERSEY, A CORPORATION OF NEW JERSEY

MECHANICALLY OPERATED SAFETY BRAKE

Application filed August 19, 1930. Serial No. 476,365.

My invention relates to improvements in mechanically operated safety brakes of the type suitable for use with hoists, elevators, etc., to automatically apply a braking force upon release by the operator—accidental or otherwise—of the working brake control. In the known types of safety brakes of this general character, it has been customary either to utilize the rotation of the element to be braked to apply the safety brake, or to operate such safety brake by means of a weight acting against and held inoperative by the working brake control. The first method is inapplicable when, as in this case, it may be desired to apply the brake in either direction of rotation of the element to be braked. Also, such a method is objectionable because it lacks positiveness of action and requires an appreciable time delay before it will operate. It has been found that the second method is very tiring on the operator since it requires acting against the safety brake applying force whenever the working brake is to be applied.

The present invention overcomes these objections without sacrificing anything in the rigidity of the brake controlling device or in the reliability and positiveness of its operation. Briefly stated, the objects of the invention are:

1. To provide an improved safety brake operating in conjunction with the regular working brake of the hoist, elevator, etc., to be operated automatically upon release of the operating means for the working brake.

2. To provide such a safety brake operating in conjunction with the working brake and which operates entirely independently of the rotation of the element to be braked.

3. To provide such a safety brake constructed so that the braking force to be applied to the safety brake is not moved during the application of the working brake.

My invention also resides in certain other details of construction, as hereinafter set forth and specifically claimed.

In the accompanying drawings, Fig. 1 represents a plan view of part of a hoist with my invention applied thereto; and Fig. 2 is an elevational view of Fig. 1 looking at same from the right side.

In the drawings, 1 represents the frame of the hoist, 2 the main hoisting shaft, 3 the winding drum of the hoist.

The regular working or service brake of the hoist is designated by 4 and comprises a brake drum 5 fixed to the shaft 2 and a cooperating brake band 6. For applying brake band 6 to the drum 5 to exert a braking force, there is provided an operating shaft 7 having its bearings in the hoist frame 1. Shaft 7 has rigidly secured to it a crank element 7a to which in turn is pivotally mounted the end 6a of the brake band 6. The other end of brake band 6 is fixedly mounted at 6b. This arrangement permits that upon rotation of shaft 7 in a clockwise direction as viewed from the right of Fig. 1, it will apply the brake. Keyed to shaft 7 is the arm 8 connected through link 9 and arm 10 with the shaft 11 upon which is keyed a lever 12. At one end of lever 12 is a foot plate 13, while at the other end is a weight 14 adapted to be adjustably positioned thereon. Lever 12 together with foot plate 13 comprise the foot treadle 12a. Link 9 is connected with arm 8 by means of a slot and pin connection 15 in such a way that a clockwise rotation of shaft 11 will be transmitted to shaft 7 so as to apply the working brake, while a counter-clockwise rotation of shaft 11 will not be so transmitted. Also keyed to shaft 7 is an arm 16 carrying a weight 17 constructed so as to release the working brake upon release of lever 12.

The safety brake, constructed similar to the working brake, is designated in general by reference numeral 18 and comprises a brake drum 19 fixed to the shaft 2 and a brake band 20. For applying brake band 20 to the drum 19, there is provided an operating shaft 21 having its bearings in the hoist frame 1. Shaft 21 has rigidly secured to it a crank element 21a to which in turn is pivotally mounted the end 20a of the brake band 20. The other end of the brake band 20 is fixedly mounted at 20b. This arrangement permits that upon rotation of shaft 21 in a counter-clockwise direction, as viewed in Fig. 2, the brake will be applied. Keyed to shaft 21 is the lever 22 carrying an adjustably positioned weight 23.

Keyed upon shaft 11 is also an arm 24 carrying a roller 25 which contacts with cam surface 26 on a portion of the lower side of lever 22. This cam surface in the position of the lever shown in Fig. 2 is concentric with the axis of shaft 11 so that as arm 24 moves to the right, lever 22 will remain in the position shown. If 24 is moved to the left, however, lever 22 will be allowed to fall through the action of weight 23 and shaft 21 will be rotated thereby in a counter-clockwise direction so as to apply the safety brake.

To prevent the safety brake from "dragging" during the normal use of the working or service brake, some suitable means such as springs 27 and 28 are provided, one end of each spring being attached to the brake band 20 and the other to any suitable part of the frame 1. A standard 29 is shown as a suitable support for the spring 27.

The above description, together with the drawings, sufficiently sets forth the detailed operation of the various parts. A brief summary of the operation of the device as a whole follows:

During the normal operation of the hoist the only brake used is the working brake 4 controlled by means of the foot treadle 12a. When the operator holds treadle 12a in its mean position as shown in Fig. 2, the working brake is not applied. When, however, the operator wishes to apply the working brake, he does so by pressing down on foot treadle 12a. The greater the braking force required, the harder the operator must press down on the foot treadle. During such manual operation of the working brake, arm 24 with its roller 25 holds the safety brake operating lever 22 in an inoperative position. If for any reason the operator takes his foot off the treadle, the weight 14, which slightly over-balances foot plate 13, etc., will cause the treadle to fly up, carrying arm 24 to the left so as to clear the cam surface 26 and so release lever 22. Thereupon, weight 23 acting through lever 22 will at once apply the safety brake and so stop the hoist.

I claim:

1. The combination with an element adapted to be rotated in either direction, of means for applying a braking force to said element and means for automatically applying a braking force to said element upon release of said first-mentioned means, each of said means being operative independently of the rotation of said element.

2. In combination with a rotative element, means independent of the operation of said element for applying a braking force to said element, and means for automatically applying a braking force to said element upon release of said first-mentioned means, said second-mentioned means being provided with means whereby the braking force applied by said second means requires no work to be done against it during the operation of the first-mentioned means.

3. In combination with a shaft, means for manually applying a braking force to said shaft, and means for automatically applying a braking force to said shaft upon release of said first-mentioned means, said second-mentioned means including a weighted lever, means associated with said weighted lever and said first-mentioned means whereby the said weighted lever is maintained in an inoperative position during the manual operation of the first-mentioned means.

4. Braking apparatus for a winding drum comprising two brakes operatively connected with the said drum, an operating lever for controlling the actuation of both brakes, movement of said lever in one direction being effective to apply one of the brakes, and means associated with said lever whereby during the said movement of said lever the other brake is maintained motionless in an inoperative position.

5. Braking apparatus for a winding drum comprising two brakes operatively connected with the said drum, an operating lever for controlling the actuation of both brakes, movement of said lever in one direction being effective to apply one of the brakes, means associated with said lever whereby during the said movement of said lever the other brake is maintained motionless in an inoperative position, and means automatically operative to apply the last-mentioned brake when the said lever is free to move in the opposite direction.

6. Braking apparatus for a winding drum comprising two brakes operatively associated therewith, an operating shaft for each brake, and an operating lever for controlling the actuation of both shafts, movement of said lever in one direction being effective to actuate one of the shafts while maintaining the other shaft in an inoperative position.

7. Braking apparatus for a winding drum comprising two brakes operatively associated therewith, an operating shaft for each brake, an operating lever for controlling the actuation of both shafts, movement of said lever in one direction being effective to actuate one of the shafts while maintaining the other shaft in an inoperative position, and means automatically operative to actuate the last-mentioned shaft when the said lever is released.

8. Braking apparatus for a winding drum comprising two brakes operatively associated therewith, an operating shaft for each brake, a lever associated with each of said shafts for actuating same, means connecting said levers so as to permit one of said levers to control the actuation of both of said shafts, movement of said last-mentioned lever in one direction being effective to actuate its associated shaft while maintaining the other lever in an inoperative position.

9. Braking apparatus for a winding drum comprising two brakes operatively associated therewith, an operating shaft for each brake, a lever associated with each of said shafts for actuating same, means connecting said levers so as to permit one of said levers to control the actuation of both of said shafts, movement of said last-mentioned lever in one direction being effective to actuate its associated shaft while maintaining the other lever in an inoperative position, and means automatically operative to actuate said last-mentioned lever when the other lever is released.

10. Braking apparatus for a winding drum comprising two brakes operatively associated therewith, an operating shaft for each brake, a lever for actuating each of said shafts, and means comprising a cam surface on one of said levers and an arm and roller engaging said cam surface and connected to the other of said levers so that a movement of the last-mentioned lever in one direction will be effective to actuate its associated shaft to apply one brake while maintaining the other lever in a position which prevents operation of its associated brake.

11. Braking apparatus for a winding drum comprising two brakes operatively associated therewith, an operating shaft for each brake, a lever for actuating each of said shafts, means comprising a cam surface on one of said levers and an arm and roller engaging said cam surface and connected to the other of said levers so that a movement of the last-mentioned lever in one direction will be effective to actuate its associated shaft while maintaining the other lever in a fixed position, and means automatically operative to actuate the last-mentioned lever when the other lever is released.

12. In a control device for a hoist, two operating shafts, a weighted lever for actuating one of the shafts, a lever for manually actuating the other of said shafts, and means connecting said levers so as to permit one of said levers to control the actuation of both of said shafts, movement of said last-mentioned lever in one direction being effective to actuate its associated shaft while maintaining the other shaft in an inoperative position.

13. In a control device for a hoist, two operating shafts, a weighted lever for actuating one of said shafts, a second lever, means connecting said levers so that operation of said second lever in one direction will maintain said weighted lever in an inoperative position while operation of said second lever in the opposite direction will release said weighted lever, and means connecting the other of said shafts with said second lever so that the operation of the latter in the first direction will actuate said last-mentioned shaft while operation of said second lever in the opposite direction will have no effect upon said last-mentioned shaft.

14. In a control device, two operating shafts, and a single lever for controlling the actuation of both shafts, movement of the lever in one direction being effective to actuate one of the shafts while maintaining the other shaft in an inoperative position.

15. In a control device, two operating shafts, a single lever for controlling the actuation of both shafts, movement of the lever in one direction being effective to actuate one of the shafts while maintaining the other shaft in an inoperative position, and means automatically operative to actuate the last-mentioned shaft when the said lever is free to move in the opposite direction.

16. In a control device for a hoist, two operating shafts, a lever for actuating each of said shafts, and means connecting said levers so as to permit one of said levers to control the actuation of both of said shafts, movement of said last-mentioned lever in one direction being effective to actuate its associated shaft while maintaining the other lever in an inoperative position.

17. In a control device for a hoist, two operating shafts, a lever for actuating each of said shafts, means connecting said levers so as to permit one of said levers to control the actuation of both of said shafts, movement of said last-mentioned lever in one direction being effective to actuate its associated shaft while maintaining the other lever in an inoperative position, and means automatically operative to actuate said last-mentioned lever when the other lever is released.

18. In a control device for a hoist, two operating shafts, a lever for actuating each of said shafts, and means comprising a cam surface on one of said levers and an arm and roller engaging said cam surface and associated with the other of said levers so that a movement of the last-mentioned lever in one direction will be effective to actuate its associated shaft while maintaining the other lever in a substantially fixed position.

19. In a control device for a hoist, two brake operating shafts, a lever for actuating each of said shafts, means comprising a cam surface on one of said levers and an arm and roller engaging said cam surface and associated with the other of said levers so that a movement of the last-mentioned lever in one direction will be effective to actuate its associated shaft while maintaining the other lever in a substantially fixed position, and means automatically operative to actuate said last-mentioned lever when the other lever is released.

20. In a hoist provided with a main hoisting shaft, the combination with a working or service brake comprising a drum mounted on the main hoisting shaft, a brake band associated with said drum, an operating shaft connected to said brake band and adapted upon rotation to apply said brake band to said drum, and gravity operated means for releasing said brake band, of a safety brake comprising a second drum mounted on the main hoisting shaft, a brake band associated with said second drum, an operating shaft connected to said brake band and adapted upon rotation to apply said brake band to said second drum, together with a single means for controlling both of said brakes, comprising a third operating shaft, a slightly over-balanced foot treadle pivoted on said third operating shaft and adapted to rotate same, a system of linkages connecting said working brake operating shaft with said third operating shaft so that a depression of said foot treadle will rotate said working brake operating shaft while a motion of the foot treadle in the opposite direction will not affect said working brake, a weighted lever mounted on said safety brake operating shaft and adapted to rotate same, a cam surface on said weighted lever, an arm fixedly mounted on said third operating shaft, a roller on said arm adapted to engage said cam surface, said cam surface being made concentric with the axis of said third operating shaft and arranged so that the weighted lever will be supported in inoperative position during a depression of said foot treadle to apply the working brake but also arranged so that upon release of the foot treadle so as to allow said over-balanced foot treadle to move in the opposite direction, the weighted lever will be released so as to apply the safety brake.

In testimony whereof I affix my signature.

HERMANN FAEHRMANN.